G. R. Moore.
Valve for Water-Pipe.
No. 75952  Patented Mar. 24, 1868
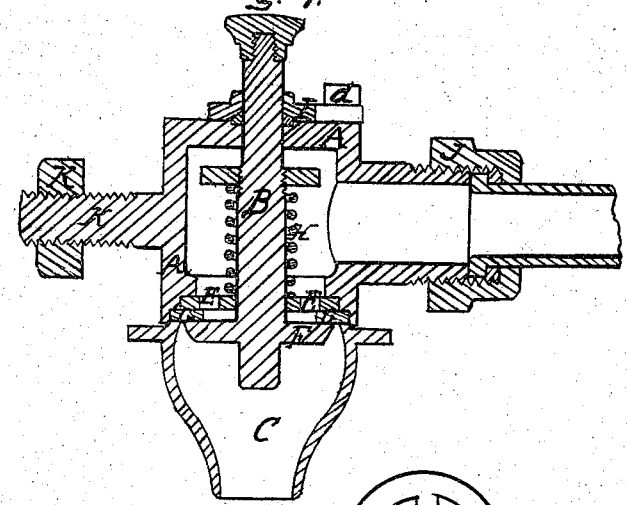
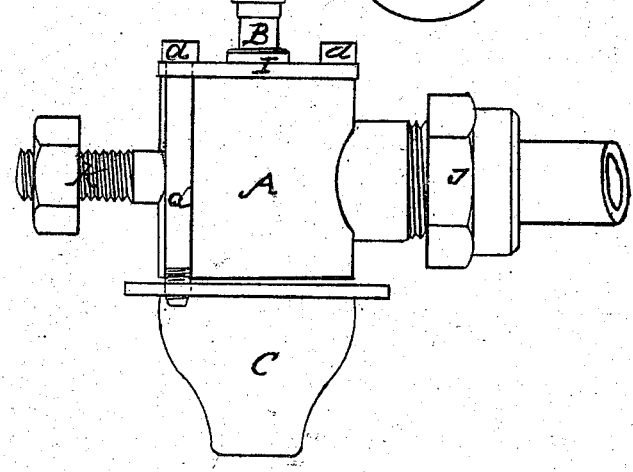
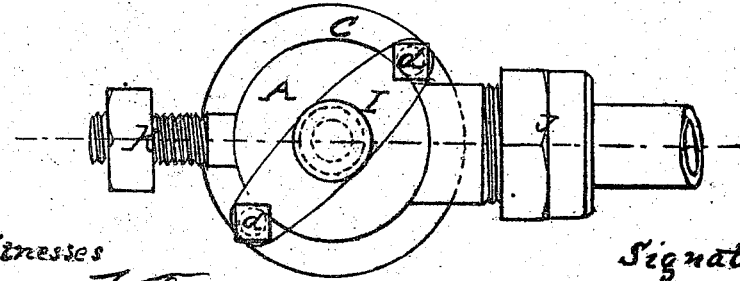
Witnesses
Emil Vossnack
A. Hörmann.
Signature
Geo. R. Moore

United States Patent Office.

GEORGE R. MOORE, OF LYONS, IOWA.

Letters Patent No. 75,952, dated March 24, 1868.

---

IMPROVEMENT IN VALVES FOR WATER-PIPES.

---

The Schedule referred to in these Letters Patent and making part of the same.

---

TO ALL WHOM IT MAY CONCERN:

Be it known that I, GEORGE R. MOORE, of Lyons, in the county of Clinton, in the State of Iowa, have invented a new and useful Improvement in Water-Valves; and I do hereby declare that the following is a full and exact description thereof, reference being had to the accompanying drawings, and to the letters of reference marked thereon.

Figure 1 is a vertical longitudinal section.

Figure 2 is a side elevation.

Figure 3 is a plan view.

This valve with my improvements differs from others in several particulars.

First. The valve-barrel A is cast with a solid head at one end, and finished at that end with but a round aperture for the valve-stem B to pass up through it.

Second. The valve-connection, with the supply-pipe, is made by means of section C, which is bolted to the valve-barrel by the bolts $d\,d$, and thus without the ordinary screw-couplings, economizing in cost of manufacturing.

Third. The guide E under the valve F is a movable piece, so that it can be placed upon the valve-stem B, with the packing G before it, the spiral spring H after it, and thus all the internal mechanism of the internal part of the valve-barrel be inserted at one end.

Fourth. The yoke I fits loosely over the stem B, and the centre hole cut through it is bevelled at the under side for packing it, (which packing it also holds.) This yoke adjusts itself by a rotary movement to any place. The flange of C may require the bolts $d\,d$ to be perpendicular; and by these bolts $d\,d$, one in either end of the yoke I, and connecting with C, the packing G is held. There is therefore no other coupling-screws for packing the valve, and the cost of manufacturing them is thereby considerably reduced.

J is an ordinary coupling for holding a pipe for the water after it has passed the valve. K, a stem and nut for bolting the valve-barrel to other work, should it be desired.

Having thus fully described my invention, what I claim therein as new, and desire to secure by Letters Patent, is—

The solid head A, valve-stem B, valve F, packing G, removable guide E, spring H, and pipe-connection C, all constructed and arranged as herein shown and described.

GEO. R. MOORE.

Witnesses:
EMIL VOSSNACK,
A. HÖRMANN.